United States Patent [19]

Shiraishi et al.

[11] Patent Number: 4,852,050

[45] Date of Patent: Jul. 25, 1989

[54] SIGNAL PROCESSING METHOD IN AUTORADIOGRAPHY

[75] Inventors: Hisashi Shiraishi, Minami-ashigara; Tsutomu Kimura; Kazuhiro Hishinuma, both of Kanagawa, all of Japan

[73] Assignee: Fuji Photo Film Co., Ltd., Kanagawa, Japan

[21] Appl. No.: 568,907

[22] Filed: Jan. 6, 1984

[30] Foreign Application Priority Data

Jan. 8, 1983 [JP] Japan .................................. 58-1330
Jan. 8, 1983 [JP] Japan .................................. 58-1331

[51] Int. Cl.$^4$ ...................... G03B 41/16; G01N 27/26; G01N 33/50; G01T 1/29
[52] U.S. Cl. ........................................ 364/414; 382/6
[58] Field of Search .................... 364/413, 414; 382/6; 435/6, 76, 77; 436/169, 174; 250/458.1, 459.1

[56] References Cited

U.S. PATENT DOCUMENTS

| | | | |
|---|---|---|---|
| Re. 31,847 | 3/1985 | Luckey | 250/327.2 |
| 4,258,264 | 3/1981 | Kotera et al. | 250/459.1 X |
| 4,315,318 | 2/1982 | Kato | 364/414 X |
| 4,320,415 | 3/1982 | Jones | 382/6 X |
| 4,389,670 | 6/1983 | Davidson et al. | 358/211 X |
| 4,496,973 | 1/1985 | Horikawa et al. | 364/414 X |
| 4,526,865 | 7/1985 | Silman | 435/803 |

FOREIGN PATENT DOCUMENTS 0738602 6/1980 U.S.S.R. .............................. 364/413

OTHER PUBLICATIONS

Sanger, F. et al., "DNA Sequencing With Chain-Terminating Inhibitors", Proc. Natl. Acad. Sci USA, vol. 74, No. 12, pp. 5463–5467, 12/1977.

Smith, L. et al., "Fluorescence Detection in Automated DNA Sequence Analysis", Nature, vol. #321, 6/12/1986, pp. 674–678.

Primary Examiner—Jerry Smith
Assistant Examiner—Charles B. Meyer
Attorney, Agent, or Firm—Gerald J. Ferguson, Jr.

[57] ABSTRACT

A signal processing method in autoradiography for determination of the base sequence of DNA or a DNA fragment, employing groups of radioactively labeled base specific cleavage products or mixtures thereof obtained by specifically cleaving the DNA or DNA fragment labeled with a radioactive element and resolved one-dimensionally in parallel relation to each other to form resolved rows on a support medium. An autograph is obtained having locational information on groups of radioactively labeled cleavage products contained in the rows on the support medium. An electrical digital signal corresponding to the autoradiograph is then generated by recording and reproducing from a stimulable phosphor sheet the radiation energy stored therein. Sampling points in each resolved row of the digital signal are next detected. Reference sampling points are then determined in a plurality of reference rows which are either directly provided on the support medium and/or synthesized from certain resolved rows. Sampling points in the remaining non-reference rows are identified by comparison with the continuous lines to thus determine the base sequence of the DNA or DNA fragment.

10 Claims, 2 Drawing Sheets

SIGNAL PROCESSING METHOD IN AUTORADIOGRAPHY

BACKGROUND OF THE INVENTION

1. Field of the Invention

This invention relates to a signal processing method in autoradiography and more particularly, to a signal processing method for comparing and identifying the resolved positions of radioactively labeled substances in autoradiography for determination of base sequences of DNA and DNA fragment.

2. Description of the Prior Art

Autoradiography has been known as a method for obtaining locational information on radioactively labeled substances distributed in at least a one dimensional direction to form a row on a support medium.

For instance, autoradiography comprises steps of: labeling organism-originating biopolymers such as proteins or nucleic acids with a radioactive element; resolving the radioactively labeled biopolymers, derivatives thereof, or cleavage products thereof (hereinafter referred to as "radioactively labeled substances") on a gell support (support medium) through a resolving process such as electrophoresis to form a resolved pattern of the radioactively labeled substances (the resolved pattern is not visible); placing said gel support and a high-sensitivity type X-ray film together in layers for a certain period of time to expose the film and developing said film to obtain the autoradiograph of the resolved pattern a a visible image on the film; and obtaining the locational information of the radioactively labeled substances from said visible image. Further, the identification of the polymeric substances, determination of molecular weight of the polymeric substances and isolation of the polymeric substances can be performed based on the obtained locational information.

The autoradiography has been effectively utilized for determining the base sequence of nucleic acids such as DNA (or DNA fragment, hereinafter "DNA" is used to include DNA as well as DNA fragments) or the like.

The Maxam-Gilbert method and Sanger-Coulson method are known as methods for sequencing DNA utilizing the autoradiography. In these methods, base sequence of DNA is determined by utilizing the characteristic structure of DNA in that DNA is in the form of double helix structure consisting of two chain molecules, which are constituted by four constitutional base units, each unit having a base, namely adenine (A), guanine (G), thymine (T) or cytosine (C), and cross-linked by hydrogen bonding between the four bases, the hydrogen bonding between each constitutional base unit comprising only two combinations, namely, G-C and A-T.

For instance, the Maxam-Gilbert method is carried out as follows: a group containing a radioactive isotope of phosphorus (P) is attached to a chain molecule of DNA or a DNA fragment at one end to be sequenched to prepare a radioactively labeled DNA molecule, and then the thus labeled DNA molecule is specifically cleaved at the constitutional base units by a certain chemical reaction. This reactions is called a "base specific cleavage reaction". Then the obtained mixture of numerous cleavage products of the DNA or DNA fragment is resolved through gel electrophoresis to give a resolved pattern of the numerous cleavage products (the pattern is not visible). An X-ray film is exposed to the resolved pattern and developed to obtain a visualized autoradiograph thereon, and the sequential position of each base from the radioisotopically labeled end of the chain molecules is read by referring to both the obtained autoradiograph and the applied base-specific chemical reaction so as to determine the sequence of all bases in the substance.

In the conventional autoradiography utilizing the radiographic process, the visualization of the autoradiograph having the locational information on radioactively labeled substances on a radiographic film is essentially required.

Investigators analyze the distribution of the radioactively labeled substances on a support medium through observation of the visualized autoradiograph. The sequence of DNA is determined by studying individual resolved positions of the radioactively labeled cleavage products (or mixture of cleavage products) of DNA on the visualized autoradiograph, and then comparing the resolved positions among the resolved rows thereof.

Since the conventional autoradiography requires the visual analysis of the autoradiograph, there is a drawback in that the locational information on the radioactively labeled substances obtained by analysis of the visualized autoradiograph varies or fluctuates depending on the skill of investigators, and the accuracy of the information is limited to a certain extent. Particularly, in such cases that the autoradiograph visualized on a radiographic film shows an image of reduced quality (in regard of sharpness, contrast, etc.), satisfactory information can be hardly obtained and the accuracy is low. In order to improve the accuracy of the locational information, for instance, a visualized autoradiograph can be scanned with a device such as a scanning densitometer. However, such scanning process requires increased operation time and complicated procedures. Further, there is a limitation on increase of the accuracy when using this device.

For instance, in carrying out the exposing procedure, the support medium carrying the above-mentioned resolved rows thereon an a radiographic film sometimes cannot be accurately arranged together in layers. In such a case, the resolved rows (e.g., electrophoretic rows) visualized on the radiogrphic film are rendered not parallel to the longitudinal direction of the film to give a dislocated pattern. As a result, error is introduced into the visual analysis of the locational information on the radioactively labeled substances to decrease the accuracy thereof.

Further, the rows of the resolved radioactively labeled rows on the support medium are sometimes made non-parallel to the longitudinal direction of the support medium or made distorted, depending on kind of the support medium or resolving conditions. For instance, a gel support medium is generally held between two glass plates in the resolving procedure because the gel lacks self-supporting property. As a result, the gel occasionally becomes uneven in thickness due to the deformation of the covers such as the glass plates and accordingly the radioactively labeled substances are not always resolved uniformly on the the gel. The lack of uniformity of the resolved pattern is also caused by air foams contained in the gel or by heterogenous dispersion of the composition of gel. For these reasons, a phenomenon such as the so-called smiling effect, i.e., a phenomenon that the migration distance of the resolved row in the vicinity of the center of the support medium is longer than those in the both sides thereof, is often observed. Additionally, if the voltage is not applied uniformly to the support medium in the electrophoresis, the resolving conditions are made locally uneven on the support medium to distort the resolved rows.

There is known no suitable method but a method of manually correcting the distortion of resolved rows. Accordingly, it is not easy to analyze the locational information on the radioactively labeled substances in the above-described cases. Even if the aforementioned device is used, it is still difficult to obtain a satisfactorily accurate locational information on the radioactively labeled substances.

SUMMARY OF THE INVENTION

The present inventors have discovered that an autoradiograph having the information on one dimensional location of the radioactively labeled substances in a sample can be obtained as digital signal without necessity of visualization thereof, by utilizing a radiation image recording and reproducing method using a stimulable phosphor sheet in place of the conventional radiography using a radiographic film. In this method, the digital signal is subsequently subjected to an appropriate signal processing to determine the base sequence of DNA or DNA fragment with ease and high accuracy.

The present invention provides a signal processing method in autoradiography for determination of base sequence of DNA or DNA fragment, employing at least two groups of radioactively labeled cleavage products obtained by specifically cleaving the DNA or DNA fragment labeled with a radioactive element, comprising the steps of:

(1) providing a mixture of cleavage products comprising four kinds of base specific cleavage products consisting essentially of guanine specific cleavage products, adenine specific cleavage products, thymine specific cleavage products and cytosine specific cleavage products; and (2) cleavage products containing providing at least one kind of base specific cleavage products, (3) resolving the reference mixtures provided in step (1) and the product provided in step (2); one-dimensionally in parallel relation to form at least two resolved rows on a support medium, (4) obtaining an autoradiograph having locational information on groups of radioactively labeled cleavage products contained in said rows on tthe support medium;

(5) generating an electrical digital signal corresponding to said autoradiograph including said rows;

(6) detecting reference sampling points in a reference row, the reference row being the resolved row of the mixture 1) of cleavage products comprising four kinds of base specific cleavage products;

(7) detecting sampling points in said one resolved row other than the reference row of the digital signal; and (8) comparing the reference sampling points in the reference row with sampling points in a resolved row adjacent to said reference row to identify the sampling points in the adjacent resolved row, recording and there after scanning and reproducing from a stimulable phosphor sheet with an electromagnetic wave to release the energy stored therein.

The present invention also provides a signal processing method in autoradiography for determination of base sequence of DNA or DNA fragment, employing at least three groups of radioactively labeled cleavage products obtained by specifically cleaving the DNA or DNA fragment labeled with a radioactive element, comprising:

(1) a mixture of cleavage products comprising four kinds of base specific cleavage products consisting essentially of guanine specific cleavage products, adenine specific cleavage products, thymine specific cleavage products and cytosine specific cleavage products; and (2) at least two groups of cleavage products in which one group of cleavage products contains at least one kind of base specific cleavage products different from base specific cleavage products contained in the other group of cleavage products, both (1) and (2) being resolved one-dimensionally in parallel relation to form at least three resolved rows on a support medium.

The present invention further provides a signal processing method in autoradiography for determination of base sequence of DNA or DNA fragment, employing at least four groups of radioactively labeled cleavage products obtained by specifically cleaving the DNA or DNA fragment labeled with a radioactive element, comprising:

(1) base specific cleavage products containing at least guanine specific cleavage products;

(2) base specific cleavage products containing at least adenine specific cleavage products;

(3) base specific cleavage products containing at least thymine specific cleavage products; and (4) base specifically cleabed product containing at least cytosine specific cleavage products, being resolved one-dimensionally in parallel relation to each other to form resolved rows on a support medium.

In the present invention the reference row means a row corresponding to a resolved row of a mixture of all the cleavage products consisting of guanine specific cleavage products, adenine specific cleavage products, thymine specific cleavage products and cytosine specific cleavage products, and is employed as an internal reference for each resolved row of radioactively labeled base specific cleavage products in the signal processing for determination of the base sequence of DNA or DNA fragment.

The reference row (internal reference row) in the signal processing of the invention can be obtained by practically providing a resolved row of the mixture of all kinds of the base specific cleavage products of DNA on a support medium, or by synthesizing a reference row from resolved rows of cleavage products of DNA through the signal processing.

DETAILED DESCRIPTION OF THE INVENTION

Figure 1:
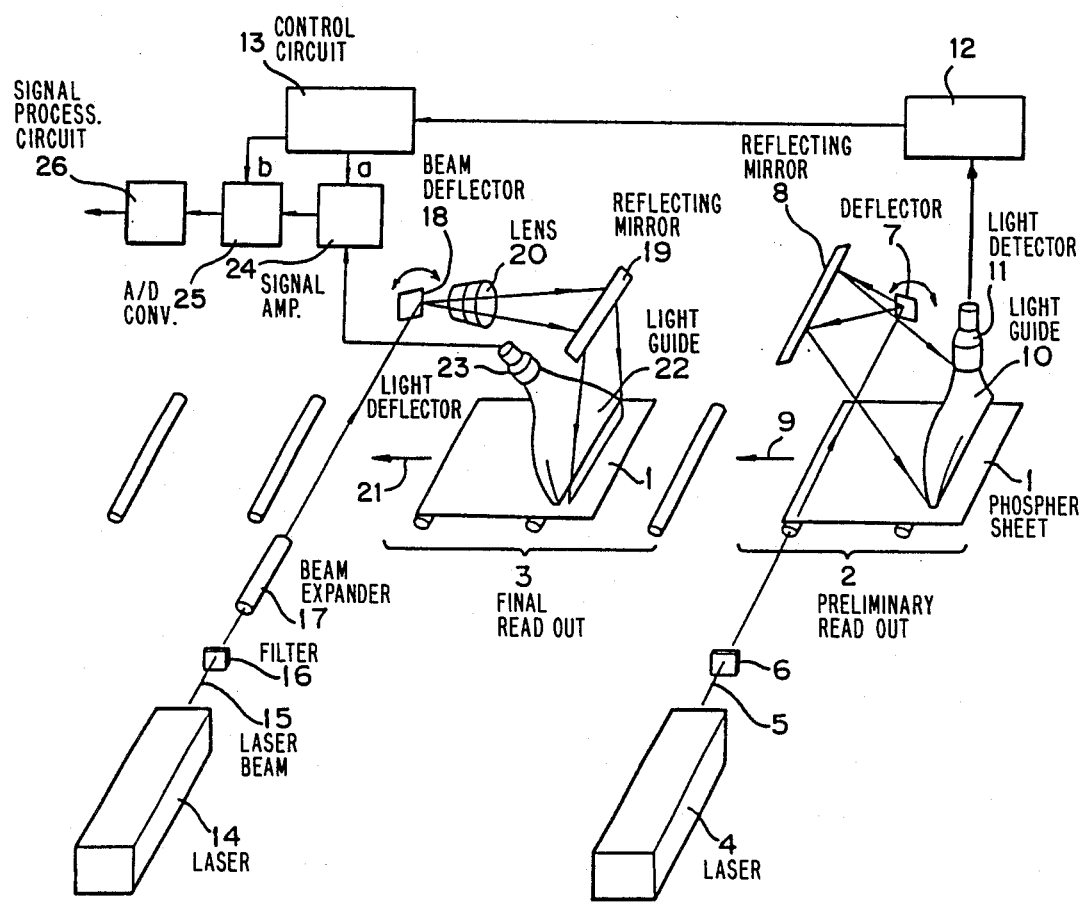
FIG. 1 shows an example of the read-out system for reading out or detecting the locational information of the radioactively labeled substances copied from the sample and stored in a stimulable phosphor sheet employable in the present invention.

The present invention utilizes the radiation image recording and reproducing method which comprises steps of: causing a stimulable phosphor of a stimulable phosphor sheet to absorb radiation energy having passed through an object or having been radiated by an object; exciting the stimulable phosphor with an electromagnetic wave such as visible light or infrared rays (hereinafter referred to as "stimulating rays") to sequentially release the radiation energy stored in the stimulable phosphor as light emission; and photoelectrically detecting the emitted light to give an electric signal; or further reproducing the electric signal in the form of a visible image on a recording material, or converting the electric signal to digital signal through A/D conversion.

Details of the above-mentioned radiation image recording and reproducing method is described in, for instance, U.S. Pat. No. 4,239,968.

The stimulable phosphor sheet contains a stimulable phosphor such as a divalent europium activated alkaline earth metal fluorohalide phosphor. When exposed to a radiation such as X-rays, $\alpha$-rays, $\beta$-rays, $\gamma$-rays, or ultraviolet rays, the stimulable phosphor absorbs a portion of the radiation energy and then emits light (stimulated emission) corresponding to the radiation energy stored therein upon excitation with an electromagnetic wave (stimulating rays) such as visible light or infrared rays, after exposure.

Accordingly, the locational information on the radioactively labeled substances in the present invention can be directly obtained as digital signal through no visualization by applying the above-mentioned radiation image recording and reproducing method to the autoradiography.

In the present invention, the term "locational information" of the radioactively labeled substances means to include a variety of information relating to the location of the radioactively labeled substances, or the aggregation thereof, being present in the sample, such as the location, the shape, the concentration, the distribution, and combinations thereof.

According to the present invention, the base sequence of DNA or DNA fragment can be determined with high accuracy, even if there occurs the distortion or dislocation in the overall length of the autoradiograph stored in the stimulable phosphor sheet due to the locational distortion of resolved rows of the radioactively labeled substances on the support medium occurring in the course of the resolving procedure, or due to the locational distortion occurring between the support medium on which the resolved rows thereof are formed in one dimensional direction and the stimulable phophor sheet in the course of the copying and storing procedure of the autoradiograph. Particularly for the distortion in the resolving direction, it makes possible to identify the resolved portions in each resolved row simultaneously with correction of the distortion so as to determine the sequence of DNA smoothly and with high accuracy.

In order to carry out the experiment for determining the base sequence of DNA efficiently, the resolved rows are generally provided on a support medium as many as possible. As a result, the distortion such as the aforementioned smilling effect generally occurs. In the present invention, the distortion can be corrected with respect to all the resolved rows utilizing the reference row (internal reference) in the signal processing, which is obtained by actually providing a resolved row of a mixture containing all the four kinds of base specific cleavage products of DNA on the support medium or by synthesizing from resolved rows of cleavage products of DNA.

Further, it is possible to identify the resolved positions of the radioactively labeled substances (namely, sampling points) with high accuracy even if the area of the individual resolved portion thereof is reduced, because the sampling points can be automatically compared and identified between the resolved rows on the digital image data. This means that the absolute amount of the radioactively labeled substances used in one autoradiographic process can be reduced, otherwise that the number of rows resolvable on a single support medium can be increased without broadening the width of support medium so as to give more information than in the case using the conventional autoradiographic process.

Examples of the sample employable in the present invention include a support medium on which base specific cleavage products and/or a mixture thereof, obtained by base-specifically cleaving radioactively labeled DNA or DNA fragment, are resolved (or developed) in one dimensional direction to form resolved rows.

Representative examples of the method for resolving (or developing) the above-mentioned radioactively labeled substances on a support medium include electrophoresis using one of various resolving mediums such as a gel in the form of layer, column or the like, a molded polymer film such as a cellulose diacetate film, and a filter paper, and a thin layer chromatography using a support of material such as silica gel. Among these, the electrophoresis using a gel support medium is preferably employed in the present invention.

The stimulable phosphor sheet employable in the present invention has a basic structure comprising a support, a phosphor layer and a transparent protective film. The phosphor layer comprises a binder and a stimulable phosphor dispersed therein, and for instance it can be obtained by dipersing particulate divalent europium activated barium fluoride ($BaFBr:Eu^{2+}$) phosphor particles in a mixture of nitrocellulose and linear polyester. The stimulable phosphor sheet is, for example, prepared by providing the above-mentioned phosphor layer onto the support such as a polyethylene terephthalate sheet and then providing a protective film such as a polyethylene terephthalate sheet on the phosphor layer.

Details on the support medium and the stimulable phosphor sheet employable in the invention are described, for instance, in Japanese patent application No. 57(1982)-193419 (the content is given in U.S. patent application filed on Nov. 7, 1983, and European patent application No. 83 110 984.8).

In carrying out the exposing procedure, that is, the procedure of storing the radiation energy released from the support medium containing the radioactively labeled substance in the stimulable phosphor sheet, at least a portion of the released radiation energy is absorbed in the stimulable phosphor sheet by placing the support medium and stimulable phosphor sheet together in layers for a certain period of time. The exposure can be accomplished by keeping the phosphor sheet in a position adjacent to the support medium, and for instance, at room temperature or lower temperature for at least several seconds.

Details of exposing procedure employable in the invention are described in Japanese patent application No. 57(1982)-193418 (the content is given in U.S. patent application filed on Nov. 7, 1983, and European patent application No. 83 110 984.8).

A method for reading out or detecting the information on one dimensional location of the radioactively labeled substances in the sample copied and stored in the stimulable phosphor sheet according to the invention will be described briefly, referring to an embodiment of a read-out system shown in FIG. 1 of the accompanying drawings.

FIG. 1 schematically illustrates an embodiment of the read-out system comprising a preliminary read-out section 2 for preliminarily reading out of the one dimensional information on the location of the radioactively labeled substances stored (or recorded) in the stimulable phosphor sheet 1 (from which the sample generally has been removed, the stimulable phosphor sheet is hereinafter referred to as "phosphor sheet"), and a final read-out section 3 for finally reading out the desired locational information on the radioactively labeled substance stored in the phosphor sheet 1.

In the preliminary read-out section 2, the preliminary read-out operation is carried out in the following manner.

Laser beam 5 generated by a laser source 4 first passes through a filter 6 to cut off a light beam in the wavelength region corresponding to the wavelength region of stimulated emission to be emitted from the phosphor sheet 1 in response to stimulation with the laser beam 5. The laser bem 5 is subsequently deflected by a beam deflecter 7 such as a galvanometer mirror, and reflected by a plane reflecting mirror 8. The deflected beam then impinges upon the phosphor sheet 1. The laser source 4 used herein is so selected as to avoid overlapping of the wavelength region of the laser beam 5 with the main wavelength region of the stimulated emission to be emitted from the phosphor sheet 1.

The phosphor sheet 1 is transferred to the direction along the arrow 9 under the irradiation of the abovementioned deflected laser beam. Therefore, the whole surface of the phosphor sheet 1 is subjected to the irradiation of the deflected laser beam. The power of the laser beam 5 employed in the preliminary read-out section is adjusted to be lower than the power of the laser beam to be employed in the final read-out section by controlling the output of the laser source 4, the beam diameter of the laser beam 5, the scanning speed of the laser beam 5, and the transferring speed of the phosphor sheet 1.

When irradiated with the above-mentioned laser beam, the phosphor sheet 1 gives the stimulated emission having the emission intensity proportional to the radiation energy stored (or recorded) therein. The emission then enters into a light guiding sheet 10 for the preliminary read-out. The light guiding sheet 10 has a linear edge face for receiving the emission, and the edge face is so positioned in the vicinity of the phosphor sheet as to correspond to the scanning line on the phosphor sheet 1. The exit of the light guiding sheet 10 is in the form of a ring and is connected to an light-receiving face of a light detector 11 such as a photomultiplier. The light guiding sheet 10 is made, for instance, by processing a sheet of a transparent thermoplastic resin such as an acrylic synthetic resin, and so constituted that the emission introduced from the linear edge face is transmitted to the exit under repeated total reflection within the sheet 10. The stimulated emission from the phosphor sheet 1 is guided in the interior of the light guiding sheet 10 to the exit, and received by the light detector 11.

The preferable shape and material of the light guiding sheet is disclosed in Japanese Patent Provisional Publications Nos. 55(1980)-87970 and 56(1981)-11397, etc.

On the light-receiving face of the light detector 11 is provided a filter which allows only the light of wavelength region of the stimulated emission to pass through and cuts off the light of the wavelength region of the stimulating rays (laser beam) so as to detect only the stimulated emission. The stimulated emission detected by the light detector 11 is converted to an electric signal, amplified in an amplifier 12 and transmitted to the output. The stored information output from the amplifier 12 is supplied to a control circuit 13 of the final read-out section 3. The control circuit 13 provides an amplification degree setting value a and a scale factor setting value b in order to obtain a signal having a suitable level according to the detected information.

The phosphor sheet 1 having been subjected to the preliminary read-out in the above-described manner is then transfered to the final read-out section 3.

In the final read-out section 3, the following read-out operation is performed.

The laser beam 15 generated by a laser source 14 for the final read-out passes through a filter 16 having the same function as that of the above-mentioned filter 6, and then the beam diameter is precisely adjusted in a beam expander 17. Subsequently, the laser beam is deflected by a beam deflector 18 such as a galvanometer mirror, and reflected by a plane reflection mirror 19. The deflected beam then impinges one-dimensionally upon the phosphor sheet 1. Between the beam deflector 18 and the plane reflection mirror 19 a $f\theta$ lens 20 is provided so that the beam speed is continuously kept constant when the deflected laser beam is scanned on the phosphor sheet 1.

The phosphor sheet 1 is transferred in the direction along the arrow 21 under the irradiation with the above-mentioned deflected laser beam. Accordingly, the whole surface of the phosphor sheet is subjected to the irradiation in the same manner as in the preliminary read-out operation.

When irradiated with the above-mentioned laser beam, the phosphor sheet 1 gives the stimulated emission in proportion to the radiation energy stored therein in the same manner as in the preliminary read-out operation. The emission then enters into a light guiding sheet 22 for the final read-out. The light guiding sheet 22 for the final read-out is of the same material and has the same constitution as the light guiding sheet 10 employed for the preliminary read-out. The stimulated emission received is guided in the interior of the light guiding sheet 22 up to the exit under repeated total reflection, and then received by a light detector 23. On the light-receiving face of the light detector 23 is provided a filter which allows only the light of wavelength region of the stimulated emission to pass through and cuts off the light of the wavelength region of the stimulating rays (laser beam) so as to detect only the stimulated emission. The stimulated emission detected by the light detector 23 is converted to an electric signal, amplified to an electric signal adjusted to an appropriate level in an amplifier 24 according to the aforementioned amplification degree setting value a and transmitted to an A/D converter 25. The adjusted electric signal is then converted to a digital signal in and A/D converter 25 according to an appropriate scale facter defined by the scale factor setting value b.

In the above description on the method for reading out the locational information on the radioactively labeled substances copied and stored in the stimulable phosphor sheet, a read-out operation involving both the preliminary read-out operation and the final read-out operation has been given. However, the read-out operation employable in the present invention is not limited to the above-described embodiment. For instance, the preliminary read-out operation may be omitted if the content of the radioactive substances in the sample and an adequate exposure time for the sample is previously known.

Further, other suitable methods than the above-mentioned embodiments may be use for reading out the locational information of the radioactively labeled substances copied from the sample and stored in the stimulable phosphor sheet.

The thus obtained digital signal corresponding to the autoradiograph of the sample is subsequently input into the signal processing circuit 26. In the signal processing circuit 26, the information on one dimensional location of the radioactively labeled substances is processed by the signal processing and represented by symbols and/or numerals, so as to determine the sequence of aimed DNA.

The signal processing method of the present invention for the determination of base sequence of DNA is described below, utilizing the above-mentioned Maxam-Gilbert method and referring to an example using the following four groups of base specific cleavage products:

(1) guanine (G) specific cleavage products,
(2) guanine (G) specific cleavage products + adenine (A) specific cleavage products,
(3) thymine (T) specific cleavage products + cytosine (C) specific cleavage products,
(4) cytosine (C) specific cleavage products.

The above combination consisting of four groups of cleavage products is employable as an example of the case that a reference row is imaginarily obtained by synthesizing from resolved rows of the above four groups in the signal processing. In the present invention, the reference row can be also obtained by using a mixture of all the base specific cleavage products and practically providing a resolved row thereof on a support medium.

DNA labeled with a radioactive element ($^{32}P$) is specifically cleaved at the constitutional base unit according to the conventional manner to prepare the above four groups (1) to (4) of base specific cleavage products. The prepared four groups of radioactively labeled cleavage products are respectively resolved on a gel support medium through electrophoresis to obtain a sample. Then, the sample (support medium on which the resolved rows are formed) is placed on a stimulable phosphor sheet together in layers at room temperature for several minutes to perform the exposure, and the autoradiograph of the sample is recorded and stored in the stimulable phosphor sheet.

Figure 2:
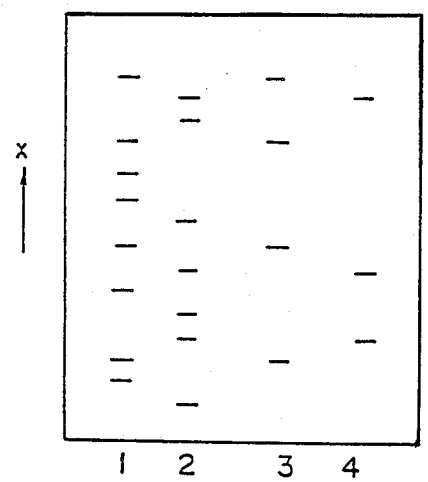
FIG. 2 shows an example of the autoradiograph of resolved rows comprising base specific clevage products of DNA.

FIG. 2 shows an autoradiograph of resolved rows (electrophretic rows) comprising the above-mentioned four groups of radioactively labeled cleavage products of DNA. That is, the first to fourth rows shown in FIG. 2 correspond to in order, (1)—(G) specific cleavage products+(A) specific cleavage products,
(2)—(T) specific cleavage products+(C) specific cleavage products,
(3)—(G) specific cleavage products,
(4)—(C) specific cleavage products.

The digital signal obtained by reading out the autoradiograph recorded and stored in the stimulable phosphor sheet by means of the read-out system shown in FIG. 1 is provided with an address (X,Y) which is represented by a coordinate system fixed to the stimulable phosphor sheet and further with a signal level (Z) in its address which corresponds to the intensity of stimulated emission. That is, the obtained digital signal corresponds to the autoradiograph shown in FIG. 2. Thus, digital image data having the locational information on the above-mentioned radioactively labeled cleavage products are input into the signal processing circuit 26. In the present invention, the digital image data mean a set of digital signals correspond to the autoradiograph of the radioactively labeled cleavage products.

In the processing method, the resolved positions of the radioactively labeled cleavage products are, in the first place, detected on the digital image data with respect to the above-mentioned four rows and assigned to sampling points. For example, the sampling points are detected as follows.

The digital image are scanned in different two positions in parallel and in such a manner that scanning traverses the one-dimensional distributed (resolved) row of the radioactively labeled cleavage products to detect distribution points thereof in each row along each scanning area (this scanning for detecting the distribution points is referred to as preliminary scanning); and the two adjoining distributed points of each row are joined with a straight line to give totally four straight lines, the straight lines being assigned to scanning lines for detecting the sampling points in each resolved row.

In the signal processing method of the present invention, the obtained digital signal is temporarily stored in a memory device of the signal processing circuit 26 (that is, a non-volatile memory unit such as a buffer memory, a magnetic disk, etc.). In the signal processing, the scanning on the digital image data means an operation for selectively picking up only the signal in the scanning area from the memory device.

Subsequently, the scanning along the scanning line is performed on the digital image data to obtain a function f(W) which represents the signal level on the scanning area, wherein W represents the position on the scanning line. Smoothing is applied to the function f(W) through convolution with a suitable filter function and the like, to obtain a function g(W). Then, the threshold-processing is applied to the function g(W). More in detail, the function g(W) is converted into a continuous function having only 1 and 0 by the following operation:

$$g(W)=1 \text{ for } g(W) \geq \alpha_0$$

$$g(W)=0 \text{ for } g(W) < \alpha_0$$

wherein $\alpha_0$ is a threshold value.

All middle points of regions of $g(W)=1$ in the function $g(W)$ are assigned to sampling points. The threshold value ($\alpha_0$) employed in the threshold processing can be determined, for instance, based on a relationship between the signal levels and the frequency of occurrence thereof with respect to the digital signal in the scanning area, namely by employing a histogram.

Thus, the sampling points $S_{kn}$ can be detected for each row, wherein k is a positive integer and represents the number of row; and n is a positive integer and represents the number of the sampling point. The sampling point $S_{kn}$ means the n-th sampling point in the k-th row. The process for detecting the sampling points is by no means restricted to the above-described process.

Figure 3:
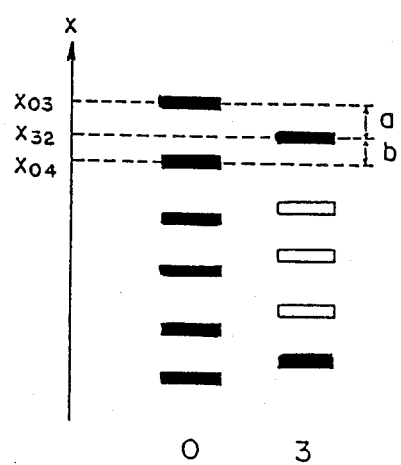
FIG. 3 is a partial view of a synthesized reference row and the third resolved row.

In the second place, the comparing-identifying process among the rows included a process for finding out the same resolved products among the rows, that is for instance, the resolved products constituting the resolved row of (G) are found out from comparison between the row of (G) and the row of (G)+(A). However, if the resolved rows are distorted as described hereinbefore, the corresponding positions of resolved products among the rows are not always coincide with each other on X-coordinate as shown in FIG. 3. The correction of the distortion has been carried out by visual judgement. According to the present invention, the distortion is automatically corrected so that the resolved rows can be compared and identified accurately using a reference row and reference sampling points therein without relying on the visual judgement.

The correction according to the present invention will be described referring to FIGS. 2 and 3.

In FIG. 2, there is observed such distortion as mentioned above among the first to fourth rows, but it is noted that the distortion between the first and second rows is rather small.

Based on the above-mentioned fact, a logical sum operation between the sampling points in the first row and the sampling points in the second row is performed, so that a row composed of sampling points for all the four kinds of base specific cleavage products which consist of (G) specific cleavage products, (A) specific cleavage products, (T) specific cleavage products and (C) specific cleavage products, namely a reference row (internal reference row), is newly obtained. Assuming that the sampling points $\{S_{On}\}$ in the obtained reference row are reference sampling points, wherein O represents the reference row and $\{\}$ represents a set of sampling points, then the set of reference sampling points $\{S_{On}\}$ consists of $\{S_{1n}\}$ and $\{S_{2n}\}$. This synthesis is represented by the operation:

$\{S_{On}\} = \{S_{1n}\} \cup \{S_{2n}\}$ wherein U represents the logical sum operator.

Secondly, the sampling points $\{S_{3n}\}$ in the third row which is adjacent to the second row constituting the reference row are compared and identified with reference to the reference sampling points $\{S_{On}\}$ in the reference row. Thus, the reference sampling points are interpolated in the third row.

For instance, concerning the sampling point $S_{3,2}$ in the third row, the position $(X_{3,2})$ of the sampling point $S_{3,2}$ is compared with the positions $(X_{0,3})$ and $(X_{0,4})$ of the reference sampling points $S_{0,3}$ and $S_{0,4}$ in the reference row. Providing $|X_{0,3} - X_{3,2}| = a$ $|X_{0,4} - X_{3,2}| = b$, and $a > b$, the sampling point $S_{3,2}$ is regarded to have the same X-coordinate as the reference sampling point $S_{0,4}$ and assigned to $S_{0,4}$. The same operation as mentioned above is repeated so that all sampling points in the third row are assigned to any one of the reference sampling points. The residual reference sampling points to which the sampling points in the third row are not assigned are interpolated in the third row based on the assigned sampling points $\{S_{3,n}\}$ in the third row, to obtain a set of imaginary reference sampling points $\{S_{3,m}\}$ in the third row, wherein m is a positive integer and coincides with the number n of reference sampling point in the reference row. Thus, an imaginary reference row is formed in the area of the third row by transferring the reference row (zero row) synthesized from the first and second rows.

FIG. 3 is a partial view of the reference row (the zero row) synthesized on the digital image data and the third row. In FIG. 3 blackened tetragons (bands) represent sampling points in each row corresponding to resolved portions of the radioactively labeled cleavage products and unblackened tetragons represent interpolated reference sampling points.

In the third place, each sampling point $S_{4n}$ in the fourth row which is adjacent to the third row is assigned to any one of the reference sampling points $\{S_{On}\}$ with reference to the obtained reference sampling points $\{S_{3m}\}$.

As mentioned above, a set of imaginary reference sampling points $\{S_{km}\}$ is successively obtained in each row with reference to the set of reference sampling points $\{S_{On}\}$ in the reference row, and at the same time every sampling point $S_{kn}$ is assigned to any one of the reference sampling points $\{S_{On}\}$.

Finally, the above first and fourth rows are rearranged. That is, an operation between the first and thirds rows.

$\{S_{1n}\} \cap \overline{\{S_{3n}\}} = \{S_{5n}\}$ wherein ∩ represents the logical product operator, is performed, so that an imaginary fifth row having a set of sampling points $\{S_{5n}\}$ is newly obtained. The obtained fifth row corresponds to a resolved row of adenine specific cleavage products alone. The same operation is performed between the second and fourth rows to obtain the sixth row having a set of sampling points $\{S_{6n}\}$. The obtained sixth row corresponds to a resolved row of only thymine specific cleavage products. Accordingly, the following four rows are newly arranged:

(3)—(G) specific cleavage products,
(4)—(C) specific cleavage products,
(5)—(A) specific cleavage products,
(6)—(T) specific cleavage products.

Concerning the third, fourth, fifth and sixth rows, the imaginary reference sampling point $S_{km}$ in each row is compared with the real sampling point $S_{kn}$ in that row in an increasing order of m. Where the former coincides with the latter, the reference sampling point $S_{On}$ corresponding to said $S_{km}$ is replaced with the coincident sampling point $S_{kn}$. Upon rearrangement of the reference sampling points in an increasing order of n, the following arrangement can be obtained.

$S_{3,1}, S_{4,1}, S_{6,1}, S_{3,2}, S_{5,1}, S_{5,2}, S_{6,2}, S_{3,3}, S_{4,2}, \ldots$ Into the above arrangement, $S_{3n} = G$, $S_{4n} = C$, $S_{5n} = A$ and $S_{6n} = T$ are introduced to give the following scheme.

G—C—T—G—A—A—T—G—C— ...

Thus, the base sequence of one chain molecule of DNA can be determined. The representation mode of the information on the base sequence of DNA obtained as described hereinbefore is by no means limited to the above-mentioned mode, and other representation modes may be utilized optionally. For instance, the relative amount of resolved base specific cleavage products can be also obtained for representation by processing the level of signal on the scanning line with an optional operation, if desired.

Further, the base sequence of both chain molecules of DNA can be represented. That is, given the information on the combination between the four bases, namely A-T and G-C, the sequence of DNA is represented by the following scheme.

G—C—G—C—A—A—T—G—C— ...

C—G—C—G—T—T—A—C—G— ...

The method for determining the base sequence of DNA utilizing the aforementioned combinations of (G, G+A, T+C, C) is an example of the determination of the sequence of DNA, and the signal processing of the present invention is by no means limited to the above combination, but various combinations are successfully employable to determine the sequence of DNA in the same manner as described above. Whatever combination is utilized, however, the combination is required to contain a mixture of all the base specific cleavage products (G, A, T, C), or to be such a combination that a reference row (internal reference row) of all the cleavage products (G, A, T, C) is obtained by synthesis from all or part of resolved rows of base specific cleavage products.

In the case of using the mixture of all the cleavage products, the resolved row of the mixture (reference row) is not always required to be provided at the center of a support medium. Nevertheless, it is preferably provided at the center thereof in order to determine the base sequence of DNA with higher accuracy.

On the other hand, in the case of obtaining a reference row through synthesis, the reference row can be synthesized from any resolved rows close to each other on a support medium, but it is preferably synthesized from plural resolved rows in the center area thereof to determine the sequence of DNA with higher accuracy. Further, the resolved row for synthesizing the reference row are preferable to exist adjacent to each other.

In the present invention, for example, another combination (G, A, T, C) may be utilized to determine the base sequence of DNA. Otherwise, the sequence of a specific base can be also determined using the combination of at least one group of base specific cleavage products and a suitable reference substance (for instance, a mixture of each base specific cleavage products).

In the above-mentioned example, the present invention was described referring to the four rows of the groups of radioactively labeled cleavage products resolved in one dimensional direction on the support medium, but the resolved rows are by no means restricted to four. The signal processing method of the present invention is more effectively applied to five or more rows. The identification according to the invention is performed to successively correct the deviation of resolved rows starting from the reference row. Accordingly, the present invention is more effectively applied to rows of as many as possible. Further, the base sequences of two or more kinds of DNA can be simultaneously determined on a single support medium, according to the invention. In this case, the reference row for one kind of DNA can be utilized for another kind of DNA. If desired, the number of resolved rows may be less than four.

The information on the base sequence of DNA determined through the above-mentioned signal processing is output from the signal processing circuit 26, and subsequently transmitted to a recording device (not shown), directly or optionally via storage in a storing means such as a magnetic tape.

Various recording devices based on various systems can be employed for the above-described purpose, for instance, a device for visualizing optically by scanning a photosensitive material with laser beam, etc., a display means for visualizing electrically on CRT, etc., a means for printing a radiation image displayed on CRT by mean of a video printer, and a means for visualizing on a heatsensitive recording material using thermic rays.

It is further possible to perform the genetic philological information processing such as comparison between the obtained base sequence of the DNA and the base sequence of another DNA which has been already recorded and stored in a suitable place.

We claim:

1. A signal processing method is autoradiography for determination of base sequence of DNA or DNA fragment, employing at least two groups of radioactively labeled cleavage products obtained by specifically cleaving the DNA or DNA fragment labeled with a radioactive element, the steps of:
   (1) providing a mixture of cleavage products comprising four kinds of base specific cleavage products consisting essentially of guanine specific cleavage products, adenine specific cleavage products, thymine specific cleavage products and cytosine specific cleavage products; and
   (2) providing cleavage products containing at least one kind of base specific cleavage products,
   (3) resolving the reference mixtures provided in step (1) and the product group provided in step (2) one-dimensionally in parallel relation to form at least two resolved rows on a support medium,
   (4) obtaining an autoradiograph having locational information on groups of radioactively labeled cleavage products contained in said rows on the support medium;
   (5) generating an electrical digital signal corresponding to said autoradiography including said rows by recording and reproducing from a stimulable phosphor sheet the radiation energy stored therein;
   (6) detecting reference sampling points in a reference row, the reference row being the resolved row of the mixture provide in step (1) of cleavage products comprising four kinds of base specific cleavage products;
   (7) detecting sampling points in said one resolved row other than the reference row; and
   (8) comparing the reference sampling points in said one reference row with sampling points in a resolved row adjacent to said reference row to identify the sampling points in the adjacent resolved row.

2. The signal processing method in autoradiograph as claimed in claim 1, wherein the sampling points are detected by processing the digital signal on respective scanning lines for plural resolved rows with at least one processing selected from the group consisting of smoothing processing and threshold-processing.

3. A signal processing method in autoradiograph for determination of base sequence of DNA or DNA fragment, employing at least three groups of radioactively labeled cleavage products obtained by specifically cleaving the DNA or DNA fragment labeled with a radioactive element the steps of:
   (1) providing a mixture of cleavage products comprising four kinds of base specific cleavage products consisting essentially of guanine specific cleavage products, adenine specific cleavage products, thymine specific cleavage products and cytosine specific cleavage products; and
   (2) providing at least two groups of cleavage products in which one group of cleavage products contains at least one kind of base specific cleavage products different from base specific cleavage products different from base specific cleavage products different from base specific cleavage products contained in the other group of cleavage products,
   (3) resolving both the reference mixtures provided in step (1) and the product group provided in step (2) one-dimenssionally in parallel relation to form at least three resolved rows on a support medium,
   (4) obtaining an autoradiograph having locational information on groups of radioactively labeled cleavage products contained in said rows on the support medium;
   (5) generating an electrical digital signal corresponding to said autoradiography including said rows by recording and reproducing from a stimulable phosphor sheet the radiation energy stored therein;
   (6) detecting reference sampling points in a reference row, the reference row being the resolved row of the mixture of cleavage products comprising four kinds of base specific cleavage products;
   (7) detecting sampling points in the resolved rows other than the reference row;
   (8) comparing the reference sampling points in the reference row with sampling points in a resolved row adjacent to said reference row to identify the sampling points in the adjacent resolved row and determining imaginary reference sampling points in said resolved row based on thus identified sampling points; and
   (9) comparing thus determined imaginary reference sampling points with sampling points in a resolved two adjacent to said resolved row for which the reference sampling points are determined in the process (3) to identify the sampling points in the adjacent resolved row.

4. The signal processing method in autoradiograph as claimed in claim 3, wherein the resolved rows other than the reference row are provided on both sides of the reference row on the support medium; and the process (3) is carried out on said resolved rows provided in both sides of the reference row.

5. The signal processing method in autoradiography as claimed in claim 3 or 4, wherein the sampling points are detected by processing the digital signal on respective scanning lines for the plural resolved rows with at least one processing selected from the group consisting of smoothing and threshold-processing.

6. The signal processing method in autoradiograph as claimed in claims 3 or 4, wherein the employed cleavage products of DNA or DNA fragment contain at least five groups of cleavage products consisting of:
   (1) guanine specific cleavage products
      and adenine specific cleavage products
      and thymine specific cleavage products
      and cytosine specific cleavage products
   (2) base specific cleavage products containing guanine specific cleavage products;
   (3) base specific cleavage products containing adenine specific cleavage products;
   (4) base specific cleavage products containing thymine specific cleavage products; and
   (5) base specifically cleavage product containing cytosine specific cleavage products.

7. A signal processing method in autoradiography for determination of base sequence of DNA or DNA fragment, employing at least four groups of radioactively labeled cleavage products obtained by specifically cleaving the DNA or DNA fragment labeled with a radioactive element, comprising:
   (1) providing base specific cleavage products containing at least guanine specific cleavage products;
      adenine specific cleavage products;
      thymine specific cleavage products; and
      base specifically cleabed product containing at least cytosine specific cleavage products,
   (2) resolving said base cleavage products one-dimensionally in parallel relation to each other to form resolved rows on a support medium,
      detecting sampling points in each resolved row;
      synthesizing a reference row from the plural resolved rows and assigning the sampling points in the reference row to reference sampling points;
   (3) obtaining an autoradiograph having locational information on groups of radioactively labeled cleavage products contained in said rows on the support medium;
   (4) generating an electrical digital signal corresponding to said autoradiogaph including said rows by recording an reproducing from a stimulable phosphor sheet the radiation energy stored therein;
   (5) comparing the reference sampling points in the reference row with sampling points in a resolved row adjacent to the reference row employed for the synthesis of said reference row to identify the sampling points in the adjacent resolved row and determining imaginary reference sampling points in said resolved row based on thus identified sampling points; and
   (6) comparing thus determined imaginary reference sampling points with sampling points in a resolved row adjacent to said resolved row for which the reference sampling points are determined in the process (3) to identify the sampling points in the adjacent resolved row.

8. The signal processing method in autoradiography as claimed in claim 7, wherein resolved rows are provided in both sides of the resolved rows used for the synthesis of reference row on the support medium; and the process (3) is carried out for said resolved rows provided in both sides thereof.

9. The signal processing method in autoradiography as claimed in claim 7 or 8, wherein the sampling points are detected by processing the digital signal on respective scanning lines for the plural resolved rows with at least one processing selected from the group consisting of smoothing and threshold-processing.

10. The signal processing method in autoradiography as claimed in claim 7 or 8, wherein the employed cleavage products of DNA or DNA fragment contain at least four groups of cleavage products consisting of:

(1) guanine specific cleavage products;
(2) guanine specific cleavage products+adenine specific cleavage products;
(3) thymine specific cleavage products+cytosine specific cleavage products;
(4) cytosine specific cleavage products.

* * * * *